United States Patent [19]

Manz

[11] 4,048,465
[45] Sept. 13, 1977

[54] METHOD AND TORCH FOR SUSTAINING MULTIPLE COAXIAL ARCS

[75] Inventor: August Frederick Manz, Union, N.J.
[73] Assignee: Union Carbide Corporation, New York, N.Y.
[21] Appl. No.: 636,624
[22] Filed: Dec. 1, 1975
[51] Int. Cl.² .............................................. B23K 9/00
[52] U.S. Cl. ............................................... 219/121 R
[58] Field of Search ................ 219/121 R, 121 P, 74, 219/75, 130

[56] References Cited

U.S. PATENT DOCUMENTS

| 3,064,114 | 11/1962 | Cresswell et al. | 219/74 |
| 3,153,133 | 10/1964 | Ducati | 219/121 P |
| 3,484,575 | 12/1969 | Cunningham | 219/74 |
| 3,612,807 | 10/1971 | Liefkens et al. | 219/121 P |

Primary Examiner—J. V. Truhe
Assistant Examiner—Fred E. Bell
Attorney, Agent, or Firm—John R. Doherty

[57] ABSTRACT

A torch having a first non-constricting arc electrode disposed within the longitudinal bore of a second non-constricting arc electrode with the ac attachment end of the second arc electrode being annular in cross-section and extending a predetermined distance from the current transfer means for the first arc electrode. An arc is established from the arc attachment end of each arc electrode from at least one source of power. Both arcs are shielded in common with a single common shielding medium.

14 Claims, 3 Drawing Figures

METHOD AND TORCH FOR SUSTAINING MULTIPLE COAXIAL ARCS

This invention relates to an arc working torch and method for establishing and sustaining multiple coaxial arcs.

Multiple arc welding is not a new phenomena. In the past the source for each arc was a separate arc torch assembly with its own source of power. The torch assemblies were aligned so that the arcs would be spacially oriented closely adjacent to one another or merged together to form a single heat source. More recently, an arc process has been developed combining a plasma constricted arc with a metal inert gas arc with the former arc encircling and converging with the latter arc so as to form a composite arc discharge. The plasma arc is generated in the conventional manner by passing a plasma stream of gas through a constricting nozzle which collimates a nonconsumable electrode arc preferably established from an off-set tungsten electode. The plasma arc gas stream maintains the two arcs separate from one another. A constricting nozzle and a plasma gas stream are essential to the formation of a plasma arc. Any spatter which collects upon the constricting nozzle will distort the flow of plasma gas and cause irregularities in the plasma arc. Extreme care must therefore be taken in the alignment and control of the interior metal inert gas arc to prevent such spatter collection on the constricting nozzle. This places a severe operational restriction on the composite plasma-mig arc teaching. Moreover, the requirement of a separating arc gas stream is a further limitation of the composite plasma-mig arc process.

The arc working torch and method of the present invention provides the means for establishing and sustaining multiple coaxial arcs which do not depend upon the use of a constricting nozzle or require an arc separating gas stream. In fact, by appropriately designing the electrode assembly each arc is self-sustaining and essentially retains its individual characteristic despite the coaxial nature of the arcs, the proximity of the arcs to one another and the complete absence of any separating shielding gas and/or other medium.

Accordingly, it is the principle object of the present invention to provide an arc working torch and method for establishing and maintaining multiple coaxial arcs.

Further objects and advantages of the present invention will become apparent from the following detailed description when taken in connection with the accompanying drawings, in which.

Figure 1:
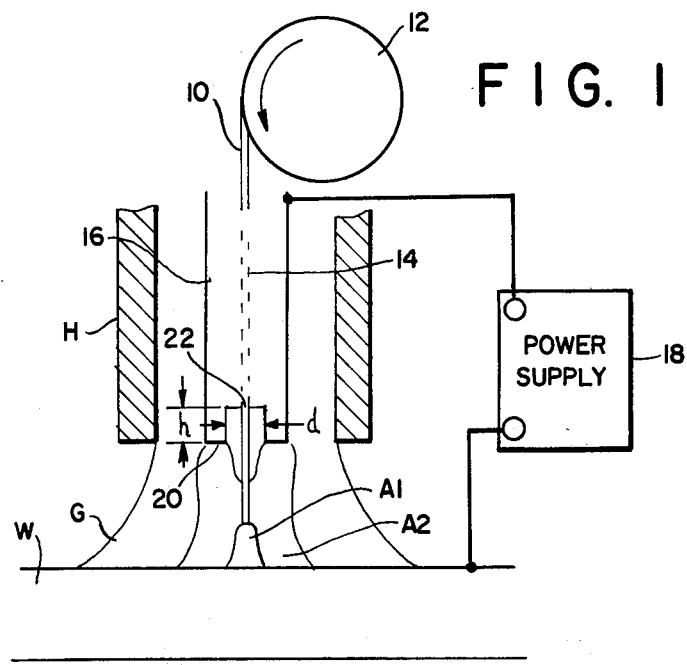
FIG. 1 is a diagrammatic representation of one embodiment illustrative of the coaxial arc torch of the present invention.

FIG. 1 shows a simplified diagrammatic layout of the single electrode coaxial arc version of the present invention. A consumable electrode wire 10 is fed from a supply spool 12 through the bore 14 of the single electrode body 16 in the direction of the workpiece W. The wire 10 is controllably driven by a conventional motorized drive roll assembly (not shown). The electrode body 16 is connected to one terminal of the power supply 18 with the opposite terminal of the power supply 18 connected to the workpiece W.

The single electrode body 16 is of preferably tubular geometry with the bore 14 centrally disposed and extending along its longitudinal axis. The bore 14 serves as a conduit for directing the consumable electrode wire 10 toward the workpiece W as well as a conventional contact tip for transferring current from the power supply 18 through the electrode body 16 into the consumable electrode wire 10. The point of introduction of the current into the moving electrode wire 10 is critical in sustaining a dual coaxial arc from the electrode body 16 as will be elaborated upon hereafter.

The single tubular electrode body 16 terminates in an outer end 20 having a predetermined annular cross-sectional geometry which is preferably planar. The outer end 20 lies a predetermined distance $d$ beyond the contact point 22 located along the bore 14 and forms a circular cavity through which extends the consumable electrode 10. Downstream of the contact point 22 the diameter of the bore 14 is enlarged to a minimum predetermined diameter $d$ sufficient to avoid physical contact with the electrode 10. The contact point 22 is thus the principle current transfer point between the electrode body 16 and the electrode 10 for introducing current into the moving electrode 10 from the power supply 18. In fact, the bore diameter upstream of the current contact point 22 may also be enlarged without departing from the scope of the present invention provided the diameter of the bore 14 at the current contact point 22 be properly sized relative to the diameter of the electrode to assure an adequate current contact surface. The distance $h$ upstream of the outer end 20 must be about 2 mm or more in length and the diameter $d$ should be about equal to twice the diameter or more of the moving electrode 10.

The outer end 20 of the tubular electrode body serves as the arc attachment end for a nonconsumable arc A2 established between such outer end 20 and the workpiece W. Is is essential that the outer end 20 be of annular cross-sectional geometry to provide as much area for arc attachment as is necessary to sustain the nonconsumable arc A2 without undesirable melting of the electrode body 16. A consumable arc A1 is established between the moving consumable electrode 10 and the workpiece W and lies within interior of the nonconsumable arc A2. Although the two arcs are essentially coaxial to one another, receive power from a common electrode body 16 and terminate in common upon the workpiece W, the arcs are essentially independent of one another and essentially retain their individual characteristics. The arcs A1 and A2 do not unite to form a single arc discharge.

For proper operation, and in accordance with conventional practice for nonconsumable electrode arcs, the outer arc A2 should be shielded from the atmosphere by a shielding medium such as a shielding gas G supplied from a supply source (not shown). Following conventional practice the shielding gas G is directed between the electrode body 16 and an outer gas nozzle H which is preferably electrically nonconductive and of a ceramic composition.

Figure 3:
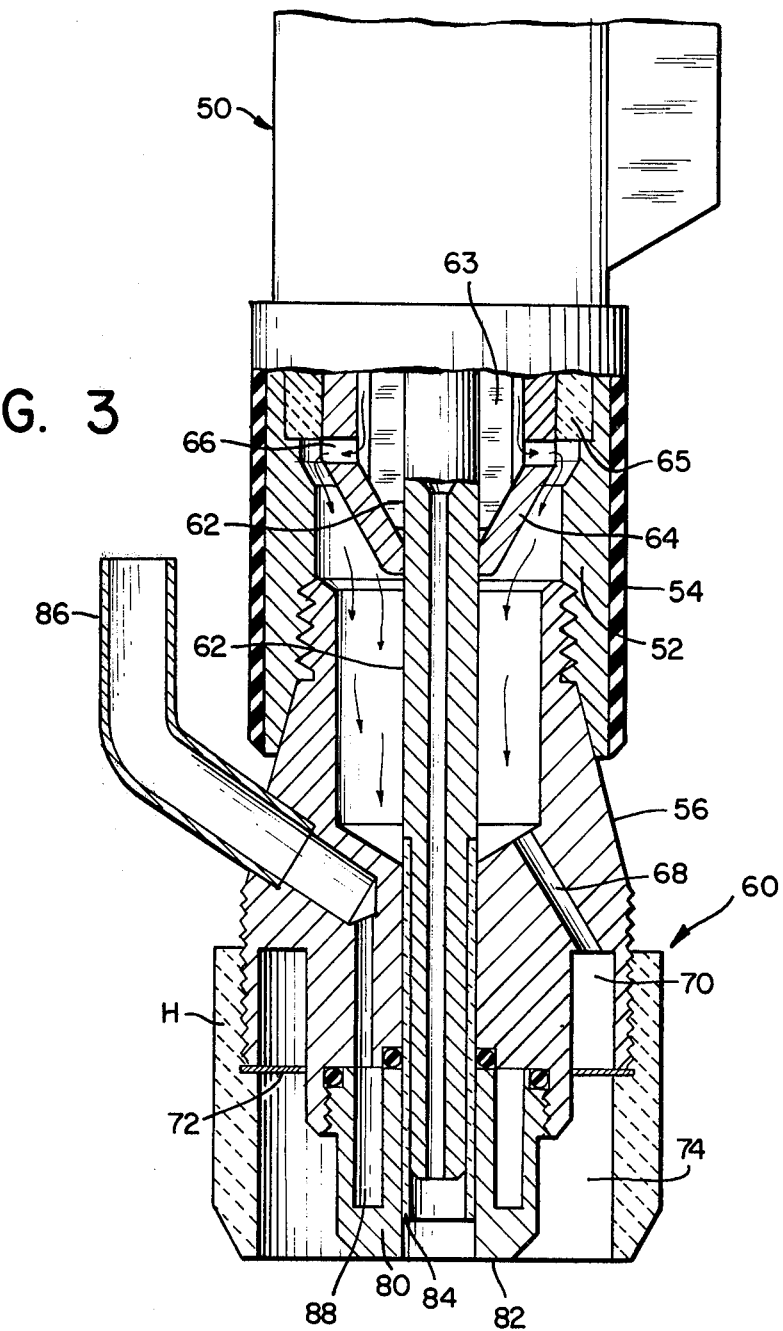
FIG. 3 is a more detailed drawing of the coaxial arc torch assembly of FIG. 2.

Since the single electrode body 16 serves to support two independent arcs A1 and A2 respectively, it must necessarily be cooled and preferably with a liquid medium such as water. Water cooling of an electrode body assembly is not new and can be accomplished in a conventional manner by placing a water cooling chamber around the electrode body or integral with it as shown in FIG. 3. In addition, since the electrode body 16 transfers the current to the electrode 10 it is preferably composed of a highly conductive material such as, for example, copper or silver.

The welding current for arc A1 is controlled in a conventional manner by coordinate control of the electrode feed rate and the setting of the power supply voltage. The distance between the current transfer point 22 and the workpiece W, the feed rate of electrode 10 and the settings of the power supply 18 will determine the operating parameters of the consumable arc A1. It is preferable that arc A1 be maintained in a non short circuiting metal transfer mode to avoid spatter contamination.

The current delivered by the power supply divides, in a predictable manner, between the inner consumable electrode arc A1 and the outer non-consumable electrode arc A2. The current division may be varied by changes in the consumable electrode extension, including setback $h$, as well as the torch-to-work distance. Should the length of arc A1 increase accidently, or by design, to the point where it enters within the recess formed between the outer end 20 of the electrode body 16 and the contact point 22 it will extinguish. Upon the extinction of arc A1, the electrode 10 advances downstream toward the workpiece W until it reignites arc A1 which will occur before engaging the workpiece W due to its location within the core of the outer arc A2.

The inner arc A1 provides directional stability for the outer arc A2. When the inner arc A1 is extinguished the outer arc A2 loses its stiffness and wanders over the workpiece. The coaxial current paths of the inner and outer arcs A1 and A2 causes the outer arc A2 to follow the current path of the inner arc A1.

The critical separation established between the outer end 20 of the electrode body 16 and the current transfer point 22 provides a small but essential voltage drop between the potential at the arc attachment end 20 on the nonconsumable electrode body 16 and a point on the consumable electrode 10 which is equidistant from the workpiece W. The slightly higher voltage at the outer end 20 is required to prevent extinction of the outer arc and provides stability for coaxial arc operation.

It is not necessary to the present invention that the inner arc originate from a consumable electrode. If a nonconsumable inner electrode is used its relationship to the outer electrode will necessarily be fixed. When properly arranged relative to one another two non-consumable electrode arcs will be formed which are coaxial to one another. The arcs may be initially established by scratch or high frequency starting techniques.

Figure 2:
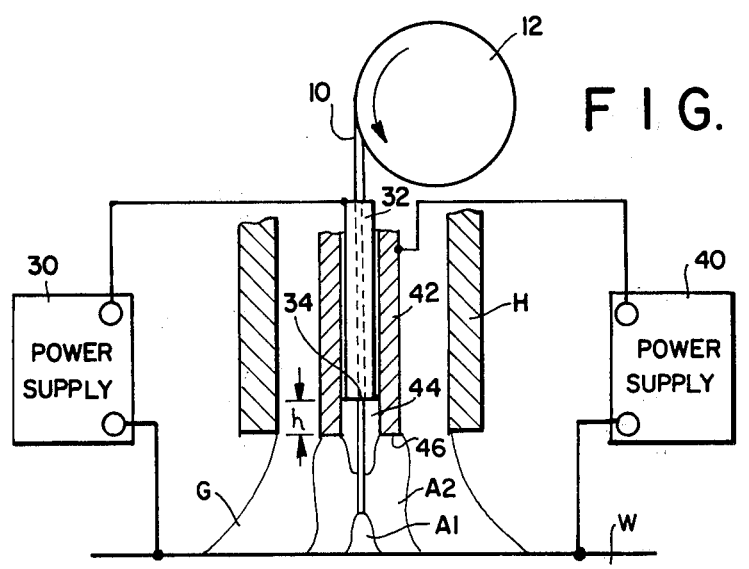
FIG. 2 is a diagrammatic representation of a second embodiment illustrative of the coaxial arc torch of the present invention.

An alternative version of the coaxial arc system of the present invention is shown in FIGS. 2 and 3. In this embodiment the inner arc A1 is established from a first power supply 30 which is connected to a contact tube 32 and to the workpiece W. The contact tube 32 guides the consumable electrode 10 from the supply spool 12 toward the workpiece W while transferring current from the power supply 30 into the electrode 10 at the discharge end 34 of the contact tube 32.

The outer arc A2 current path is established from a second power supply 40 through the nonconsumable electrode 42, which is preferably of a tubular geometry, to the workpiece W. The electrode 42 has a substantially centrally disposed bore 44 which extends along its longitudinal axis and surrounds the contact tube 32. The nonconsumable electrode 42 terminates in an outer end 46 which extends a predetermined distance $h$ beyond the discharge end 34 of the contact tube 32. The outer end 46 thus forms a circular cavity through which extends the consumable electrode 10. The distance $h$ of FIG. 2 conforms to its identical counterpart distance $h$ of FIG. 1 representing a distance of about 2 mm or more in length. The outer end 46 has a predetermined annular cross-sectional geometry which is preferably planar.

The outer arc A2 should be shielded in a conventional manner similar to FIG. 1, by passing a shielding gas G between the nonconsumable electrode 42 and an outer gas nozzle H. In addition, the nonconsumable electrode 42 should be of a conductive material such as copper and should preferably be water cooled.

The welding current for the inner arc is controlled by the electrode feed rate and power supply setting in the conventional gas metal arc manner. Since, in this coaxial arc version of the invention, the power supply circuit for the inner arc A1 is different from the power supply circuit for the outer arc A2 many more power supply-feed rate combinations are possible as compared to the common electrode body version of FIG. 1. For example, in FIG. 2 the power supply 30 can be either of the constant potential or constant current type with constant or controlled feed rates respectively. A power supply 40 with conventional volt/ampere characteristics curves can be used to control the outer arc A2 current through the electrode 42.

FIG. 3 shows a preferred coaxial arc torch construction for the system arrangement of FIG. 2.

The conventional gas metal arc torch body 50 comprises an outer metal end 52 covered by an insulating sheath 54. The outer metal end 52 is threadably engaged to the nonconsumable electrode body 56 of the coaxial arc assembly 60. The consumable electrode contact tube 62 is held in alignment with the longitudinal axis of the torch body 50 by a retaining collet 63 which is wedged against the contact tube 62 upon adjustment of the collet locking member 64. An insulating sleeve 65 electrically separates the collet 63 and collet locking member 64 from the outer metal end 52 of the torch body 50. Shielding gas passageways 66 are provided in the collet locking member 64 for passing gas as shown by the arrows through the drillings 68, of which only one is shown, in the electrode body 56 and then into the annular chamber 70 from whence the gas passes through a porous gas diffusion barrier 72 into a further annular chamber 74. The annular chamber 74 may be filled with a steelwool. The steelwool acts as an additional porous barrier to assist in providing common gas shielding around the outer nonconsumable electrode 80 for both the nonconsumable electrode arc and the gas metal arc respectively. The nonconsumable electrode 80 is preferably of a highly thermally and electrically conductive material such as copper and is threadably engaged to the conductive electrode body 56. The arc attachment surface 82 of electrode 80 is planar and of annular cross-section. The electrode 80 and electrode body 56 are separated electrically from the contact tube 62 by an insulating tube 84. Power is provided to the electrode 80 through the electrode body 56 from a first power supply (not shown) connected in turn to the outer metal end 52 through a direct mechanical connection (not shown). In like manner power is provided to the contact tube 62 from a second power supply (not shown) through the retaining collet 63 in a conventional manner.

Cooling water is passed from an external source (not shown) through the conduit 86 into the cooling chamber 88 formed in the outer nonconsumable electrode 80. The cooling water circulates about the electrode 80 and exits through a conduit from the opposite side (not shown). A typical flow rate of only 1.5 gallons per minute was found satisfactory.

The primary advantage of the embodiment of FIGS. 2 and 3 over that of FIG. 1 is the versatility in the choice of power supply for each of the arcs. Not only can the characteristics of each power supply differ from each other but the type as well may differ, i.e., various combinations of supply power are within the scope of the present invention including AC and pulse power. Likewise, although the inner electrode in the embodiment of FIGS. 2 and 3 is preferably a consumable electrode, a nonconsumable electrode may be used. In such instance a conventional tungsten electrode and collet assembly would be used in place of the contact tube 62 for both transferring current to the electrode and holding the electrode in a fixed position relative to the workpiece.

It is also within the scope of the present invention to use as the inner electrode two relatively small diameter electrode wires which would be passed together through the contact tube for forming an inner arc of substantially rectangular geometry.

What is claimed is:

1. An arc working torch for establishing multiple independent arc discharges in a coaxial relationship to one another from at least one source of power, with said arc discharges originating on separate electrodes and terminating upon a common workpiece, comprising:
   a first arc electrode having an arc attachment end upon which a first arc originates;
   a second arc electrode having an arc attachment end upon which a second arc originates;
   the arc attachment end of said second arc electrode having an annular cross-section and forming a cavity within said second arc electrode;
   said first arc electrode being disposed within said second arc electrode and extending into said cavity in spaced apart relation to the annular cross-section arc attachment end of said second arc electrode;
   the arc attachment end of both said first and second arc electrodes adapted to be spaced apart a predetermined distance respectively from the workpiece to provide a nonconstricting arc sustaining region between said electrodes and said workpiece for establishing separate coaxial arcs between said first and second arc electrodes and the workpiece;
   means located a predetermined distance from the arc attachment end of said second arc electrode for transferring current to said first arc electrode;
   means for transferring current to said second arc electrode;
   means for cooling said first and second arc electrodes; and
   means for shielding said first and second arcs in common with one another.

2. An arc working torch as defined in claim 1 wherein said second arc electrode is formed from a material of high conductivity.

3. An arc working torch as defined in claim 2 wherein said first arc electrode is a consumable electrode.

4. An arc working torch as defined in claim 3 wherein said means for transferring current to said first arc electrode is connected in common to said means for transferring current to said second arc electrode.

5. An arc working torch as defined in claim 3 wherein said means for transferring current to said first arc electrode is adapted for connection to a first power supply and wherein said means for transferring current to said second arc electrode is adapted for connection to a second power supply.

6. An arc working torch as defined in claim 2 wherein said first arc electrode is a nonconsumable electrode.

7. An arc working torch as defined in claim 6 wherein said means for transferring current to said first arc electrode is connected in common to said means for transferring current to said second arc electrode.

8. An arc working torch as defined in claim 6 wherein said means for transferring current to said first arc electrode is adapted for connection to a first power supply and wherein said means for transferring current to said second arc electrode is adapted for connection to a second power supply.

9. An arc working torch as defined in claim 1 wherein said second arc electrode has a substantially centrally disposed bore extending along its longitudinal axis and wherein said first arc electrode is disposed within said bore and extends into said cavity at the arc attachment end of said second arc electrode.

10. An arc working torch as defined in claim 9 wherein said cavity is circular in cross-section and has a diameter of about at least two times the diameter of said first arc electrode.

11. A method of establishing and sustaining coaxial arcs between at least a pair of electrodes and a workpiece, comprising the steps of:
   providing a first arc electrode having an arc attachment end for originating a first arc;
   providing a second arc electrode having an arc attachment end with an annular cross-section for originating a second arc;
   positioning said first arc electrode within said second arc electrode such that the arc attachment end of said first arc electrode is maintained is spaced apart relation to the annular cross-section arc attachment end of said second arc electrode;
   maintaining a nonconstricting arc sustaining region between the arc attachment end of both said first and second arc electrodes and the workpiece;
   introducing a first current into said first arc electrode at a location which is set back a predetermined distance from the arc attachment end of said second arc electrode, said first current being of a predetermined magnitude sufficient to establish and sustain the first arc between the arc attachment end of said first arc electrode and the workpiece;
   introducing a second current into said second arc electrode of a magnitude sufficient to establish and sustain the second arc between said second arc electrode and the workpiece; and
   surrounding said first and second arcs in common with a common shielding medium.

12. A method as defined in claim 11 wherein said first and second currents are provided from a single source of power.

13. A method as defined in claim 11 wherein said first and second currents are provided from separate sources of power.

14. A method as defined in claim 13 wherein said first electrode is a consumable electrode and wherein said second electrode is a nonconsumable electrode of a highly conductive material.

* * * * *

UNITED STATES PATENT OFFICE
CERTIFICATE OF CORRECTION

Patent No. 4,048,465  Dated September 13, 1977

Inventor(s) August Frederick Manz

It is certified that error appears in the above-identified patent and that said Letters Patent are hereby corrected as shown below:

Abstract- line 3, "ac" should read -- arc --.

Column 2, line 17 "d" should read -- h --.

Column 2, line 40, "Is" should read -- It --.

Column 6, claim 11, line 40, "is" (second occurrence) should read -- in --.

Signed and Sealed this

Twenty-first Day of March 1978

[SEAL]

Attest:

RUTH C. MASON
Attesting Officer

LUTRELLE F. PARKER
Acting Commissioner of Patents and Trademarks